March 8, 1960 D. F. ALBANESE 2,928,054
TIME POSITION MODULATOR USING
NON-LINEAR SATURABLE ELEMENT
Filed Nov. 8, 1956

Inventor
DAMIAN F. ALBANESE
By Alfred C. Hill
Agent

United States Patent Office 2,928,054

Patented Mar. 8, 1960

2,928,054

TIME POSITION MODULATOR USING NON-LINEAR SATURABLE ELEMENT

Damian F. Albanese, Irvington, N.J., assignor to International Telephone and Telegraph Corporation, Nutley, N.J., a corporation of Maryland Application November 8, 1956, Serial No. 621,120

12 Claims. (Cl. 332—12)

This invention relates to signal translating circuits and more particularly to a signal translating circuit to produce an output pulse having a position with respect to the beginning of a sampling period proportional to a non-linear function of the modulating signal.

Magnetic amplifiers have been discussed extensively in the prior art literature. Of particular interest in the instant case is an article "The Magnetic Amplifier as an Analog Computer Component," by Leonard J. Craig, Proceedings of the I.R.E., volume 41, No. 10, October 1953, pages 1477 to 1482. In this article there is disclosed that by using a magnetic amplifier circuit, it is possible to obtain pulses position modulated where the position modulation is a linear function of the modulating signal. As pointed out, it is absolutely necessary to employ energy waves having a linear time integral as the carrier or sampling voltage. The energy wave having a linear time integral discussed in the article was a square wave. The circuit, according to the article, to achieve the modulated pulses having a position modulation as a linear function of the modulating signal includes a parallel connected magnetic amplifier, a source of energy waves or carrier voltage having a linear time integral coupled to the magnetic amplifier arrangement, a source of modulating voltage coupled to each branch of the parallel connected magnetic amplifier and an output resistor coupled to enable the removal of the resulting output pulses.

An object of this invention is to provide a signal translating circuit employing saturable material having non-linear characteristics to provide an output pulse having a displacement from a predetermined time position which is proportional to a non-linear function, such as square, cube, square root, logarithm or antilogarithm, of the modulating signal rather than an output pulse whose position is a linear function of the modulating signal.

Another object of this invention is to provide a pulse position modulation compressor circuit employing saturable material having a non-linear characteristic where the position of the output pulses is proportional to a given non-linear function of the modulating signal.

Still another object of this invention is to provide a pulse position modulation expander employing saturable material having a non-linear characteristic where the position of the output pulses is proportional to a given non-linear function of the modulating signal. Where the expander and compressor circuits of this invention are employed in a communication system, it is necessary that the position of the output pulses which is proportional to a given non-linear function of the modulating signal at the expander and be such as to return the compressed position modulated pulses applied thereto to a deviation which is linearly related to the modulating signal applied to the compressor end of the communication system.

A feature of this invention is the provision of a source of energy waves having a given non-linear time integral coupled to a saturable material having non-linear characteristic and a source of modulating signal in coupled relation to said saturable material to control the time of saturation thereof to be non-linearly related to said modulating signal.

Another feature of this invention is the provision of a non-linear magnetic material to provide the non-linear saturable material of the circuit of this invention.

In the above-mentioned prior art article the saturable material disclosed is a magnetic saturable material arranged as a magnetic amplifier. A saturable material not envisioned by the prior art article which is particularly suitable for carrying out the present invention is a non-linear dielectric material.

Accordingly, still another feature of this invention is the provision of a non-linear dielectric material to provide the non-linear saturable material of the circuit of this invention.

The above-mentioned and other features and objects of this invention will become more apparent by reference to the following description taken in conjunction with the accompanying drawings, in which.

Figure 1:
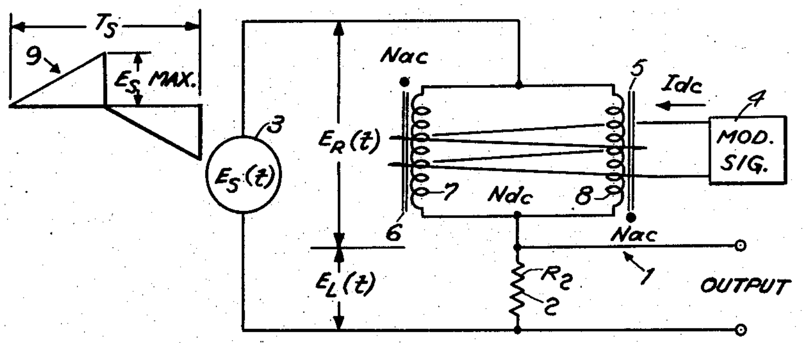
Fig. 1 is a schematic diagram representing an embodiment of a circuit following the principles of this invention.
Figure 2:
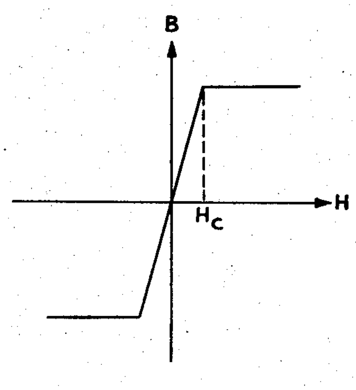
Fig. 2 is a transfer characteristic of the saturable material of Fig. 1.

Referring to Fig. 1, there is illustrated a signal translating circuit following the principles of this invention including a parallel-connected magnetic amplifier 1, a resistor load 2, a source 3 of energy waves 9, commonly called "carrier voltage," in the modulation art and a source of modulating signals 4. The magnetic amplifier 1 includes two parallel connected saturable magnetic cores 5 and 6 having a non-linear transfer characteristic as depicted in Fig. 2 and associated windings 7 and 8.

The circuit above described is substantially structurally the same as the circuit analyzed in the Craig article above identified. However, as hereinbelow described the signal from source 3 has a particular characteristic, a non-linear time integral, which causes the output pulse of the circuit to have a position non-linearly related to the signal of source 4. Thus, with the signal of source 3 being changed as below described the circuit of the article of Craig now has a different end result. As will be later pointed out, the non-linear relationship between the signal of source 4 and the time position of the output pulses as determined by the signal of source 3 enables this circuit to be employed as a pulse time modulation compressor or expander and also as an analog computer component where the position modulation may be made proportional to any function of the modulating signal.

The operation of the circuit of Fig. 1 will be analyzed mathematically to illustrate that by utilizing a source of energy or carrier voltage having a given non-linear time integral it is possible to obtain an output pulse having its time position proportional to a given non-linear function of the modulating signal.

In the anlysis that follows, the following assumptions are made. (A) The magnetic core is not saturated by $E_s(t)$, the carrier voltage when there is no modulating current, $I_{dc}$. This is expressed mathematically as $$E_{s(\max)} \leq \frac{2B_{sat}A\pi N_{ac}}{T_s 10^8}$$

where $E_{s(max)}$ is equal to the maximum carrier voltage, $B_{sat}$ is equal to the saturation level of the magnetic flux density B. A is equal to the area of the core, $N_{ac}$ is equal to the A.C. or carrier winding turns (turns of windings 7 and 8) and $T_s$ is equal to carrier voltage period. (B) The coercive force $H_c$ of the core material is very small and the carrier winding $N_{ac}$ is large enough to insure that the reactor impedance is very much greater than $R_L$, the load resistance, with no modulation signal, $I_{dc}$. This may be expressed mathematically as $I_mR_L<<E_{s(max)}$ where $$I_m=\frac{\sqrt{2}H_cL}{4\pi N_{ac}}$$

where $I_m$ is equal to the magnetizing current, L is equal to the length of magnetizing path and the other symbols being as defined above. (C) The core material B—H curve is ideal. That is, $$\frac{dB}{dH}=\mu$$

and $$\mu\rightarrow 0 \text{ when } H>H_c$$
$$\mu\rightarrow \infty \text{ when } H<H_c$$

where H is equal to the magnetizing force, B is equal to the magnetic flux density, and $\mu$ is equal to the core material permeability. (D) The average load current, $I_{av}$, is related to the modulating current, $I_{dc}$, by the equation $I_{dc}N_{dc}=I_{av}N_{ac}$, where $N_{dc}$ is equal to the D.C. or modulation winding turns and the other symbols are as above defined. This latter equation is well known in magnetic amplifier practice.

The above assumptions are idealized conditions but may be very closely adhered to in actual practice. The equations derived below use the same symbols as above defined or as defined when new symbols are employed.

The average voltage across the load resistance, $R_L$, is a measure of the average load current, $I_{av}$, in the carrier circuit, the circuit of the magnetic amplifer 1. Therefore, the average current may be expressed as:

$$(1)\qquad I_{av}=\frac{2}{R_LT_s}\int_{t_b}^{T_s/2}E_L(t)dt$$

where $F_L(t)$ is equal to the load voltage.

When a modulating signal, $I_{dc}$, is put into the magnetic amplifier 1, the cores will saturate at some time, $t_b$, with respect to the beginning of the carrier period. Once the core has saturated, the magnetic amplifier 1 essentially becomes a short circuit. Therefore, the whole of $E_s(t)$ appears across $R_L$ and the voltage, $E_L(t)$ equals $E_s(t)$. Since the load current is assumed to be negligible before time $t_b$, Equation 1 may be written as $$(2)\qquad I_{av}=\frac{2}{R_LT_s}\int_{t_b}^{T_s/2}E_s(t)dt$$

Now if assumption (D) is substituted for $I_{av}$ in Equation 2 there is obtained $$\frac{I_{dc}N_{dc}}{N_{ac}}=\frac{2}{R_LT_s}\int_{t_b}^{T_s/2}E_s(t)dt$$

or $$(3)\qquad \int_{t_b}^{T_s/2}E_s(t)\,dt=\frac{R_LT_s}{2}\cdot\frac{N_{dc}}{N_{ac}}\cdot I_{dc}$$

Equation 3 relates the time, $t_b$, at which the the core saturates and $I_{dc}$, the modulating current.

Whenever magnetic amplifier 1 saturates or fires, a pulse of voltage will appear across the load $R_L$.

Now if a carrier voltage having a non-linear time integral is provided from source 3, it may be shown that $t_b$ is proportional to a non-linear function of $I_{dc}$, the modulating signal. Assume a sawtooth waveform as illustrated by curve 9. This waveform may be generated by well known sawtooth generators, such as a gas tube sawtooth generator of the relaxation oscillator type. The waveform 9 may be expressed mathematically as $E_s(t)=Kt$ where $$K=\frac{2F_{s(max)}}{T_s}$$

Substitute for $E_s(t)$ in Equation 3.

$$\int_{t_b}^{T_s/2}Ktdt=\frac{R_LT_s}{2}\cdot\frac{N_{dc}}{N_{ac}}\cdot I_{dc}$$

$$K\left[\frac{t^2}{2}\right]_{t_b}^{T_s/2}=\frac{R_LT_s}{2}\cdot\frac{N_{dc}}{N_{ac}}\cdot I_{dc}$$

$$\frac{K}{2}[(T_{s/2})^2-(t_b)^2]=\frac{R_LT_s}{2}\cdot\frac{N_{dc}}{N_{ac}}\cdot I_{dc}$$

$$t_b=T_s\left[T_{s/4}-\frac{R_LN_{dc}}{KN_{ac}}I_{dc}\right]^{1/2}$$

This latter equation states that the firing or saturation time, $t_b$, is proportional to the square root of $I_{dc}$, the modulating signal. Thus, employing a sawtooth carrier voltage it is possible to compress the dynamic range of pulse time modulation due to a modulating signal, $I_{dc}$.

Following the procedure above a general expression may be obtained if $E_s(t)$ is allowed to vary as any power, $x$, of time, $t$. Therefore, let $E_s(t)=K_1t^x$; where $K_1$ and $x$ are arbitrary constants, but $x$ is not equal to $-1$. Substitute for $E_s(t)$ in Equation 3.

$$\int_{t_b}^{T_s/2}K_1t^xdt=\frac{R_LT_s}{2}\cdot\frac{N_{dc}}{N_{ac}}\cdot I_{dc}$$

$$\int_{t_b}^{T_s/2}K_1t^xdt=K_2I_{dc},\text{ where } K_2=\frac{R_LT_s}{2}\cdot\frac{N_{dc}}{N_{ac}}$$

$$\frac{K_1}{x+1}\left(t^{x+1}\right)_{t_b}^{T_s/2}=K_2I_{dc}$$

$$\frac{K_1}{x+1}[(T_{s/2})^{x+1}-(t_b)^{x+1}]=K_2I_{dc}$$

$$t_b=\left[(T_{s/2})^{x+1}-\frac{x+1}{K_1}\cdot K_2I_{dc}\right]^{\frac{1}{x+1}}$$

This equation states that the pulse position or firing time, $t_b$, may be made proportional to any power of $I_{dc}$, the modulating signal, by utilizing the proper signal waveform $E_s(t)$ having a non-linear time integral. By employing the proper combination of diodes and similar circuit elements, bias voltages and resistors, it would be possible to generate at least an approximation of most of the possible forms of $E_s(t)$. A function generator of the cathode ray type where the waveform desired is placed on a screen and the electron beam is caused to follow this waveform would also be useful in generating the required waveforms for $E_s(t)$ to carry out the utilization of the circuit of this invention. The immediately above equation may be written in a more compact form as:

$$(4)\qquad t_b=f[I_{dc}^{1/x+1}]$$

where $x$ is any arbitrary constant except $-1$.

As mentioned hereinabove, the circuit of Fig. 1 can be used as compressor where $E_s(t)=Kt$. Now let us illustrate the reverse complementary action, expansion.

Suppose at a transmitter modulator $E_s(t)=f(t^{+1})$, where $x=+1$. Substituting $x=+1$ in Equation 4 $t_b=f(I'_{dc}{}^{1/2})$, where $I'_{dc}$ is the modulating signal. This means that the dynamic range of the position modulated pulse signal will be compressed by a control ratio of one half.

At the receiver, the position modulated pulse signal would be demodulated linearly. This would give the square root of $I'_{dc}$ or $(I'_{dc})^{1/2}$. Normally, at the receiver, we would want the modulating signal $I'_{dc}$. Therefore $(I'_{dc})^{1/2}$ must be expanded by a control ratio of 2. This can be done by inserting the linearly demodulated signal into the modulating winding, $N_{dc}$, where $E_s(t)=f(t^{-1/2})$. As mentioned above, an approximation of this type of curve can be generated by an arrangement of diodes, resistors and bias voltages or by a function generator of the cathode ray type. Since $x=-1/2$, then from Equation 4, $$t_b=f(I_{dc}{}^{1/x+1})=f(I_{dc}{}^{1/-1/2+1})=f(I_{dc}{}^2)$$

Now let $I_{dc}=(I'_{dc})^{1/2}$, then $t_b=f(I'_{dc}{}^{1/2x2})=f(I'_{dc})$. If the resulting position modulated pulse signal is now demodulated linearly, there will be obtained $I'_{dc}$, the original modulating signal at the transmitter.

Equation 4 also suggests that the circuit of Fig. 1 may be used as an analog computer component. Since the saturation or firing time of magnetic amplifier 1 may be made proportional to any power of $I_{dc}$, by proper selection of $E_s(t)$, then any power of $I_{dc}$ may be obtained by linearly demodulating the position modulated pulses. An example may make this statement more evident. Suppose we want the cube root of $I''_{dc}$, where $I''_{dc}$ may be a varying quantity. Let $I''_{dc}$ be the modulating signal of source 4 of Fig. 1, where $E_s(t)=f(t^2)$. Since $x=2$, then $t_b=f(I''_{dc}{}^{1/3})$ or the position modulated pulses are proportional to the cube root of $I''_{dc}$. If this output is now demodulated linearly, we will obtain $I''_{dc}{}^{1/3}$ or the cube root of $I''_{dc}$, which is the desired result.

By following the procedure of substituting in Equation 3 or 4 it can be shown that the position modulated output pulse may be made proportional to the $1n\epsilon$ (natural logarithm) of the modulating signal, $I_{dc}$. This is accomplished by letting $E_s(t)=\epsilon^{K_3 t}$; where $K_3$ is an arbitrary constant and $\epsilon$ is equal to the base of natural logarithm. Substitute $E_s(t)$ in Equation 3 and there is obtained $t_b=f(1n\epsilon I_{dc})$.

The analog may be obtained by letting $E_s(t)=K_4 t^{-1}$. Substituting in Equation 3 there is obtained $$t_b=f(\text{anti } 1n\ \epsilon I_{dc})$$

It should be obvious from the above that this type of analysis may be made for any $E_s(t)$. Therefore, a general equation will be derived from Equation 3.

$$\int_{t_b}^{T_s/2} E_s(t)dt=K_2 I_{dc};\ \text{where } K_2=\frac{R_L T_s}{2}\cdot\frac{N_{dc}}{N_{ac}}$$

$$[E_s(t)dt]^{T_s/2}-[\int E_s(t)]^{t_b}=K_2 I_{dc}$$

Let $$[\int E_s(t)dt]^{T_s/2}=K_5$$

Then $$[\int E_s(t)^{t_b}=K_5-K_2 I_{dc}$$

or $$[\int E_s(t)]^{t_b}=f(I_{dc})$$

From the above equation it can be seen that the position modulated output pulses may be made proportional to any function (power, logarithm and so forth) of the modulating signal, $I_{dc}$. This proportionality will depend upon the time integral of $E_s(t)$. Of course for the purposes of this invention, this time integral of $E_s(t)$ is non-linear.

Figure 3:
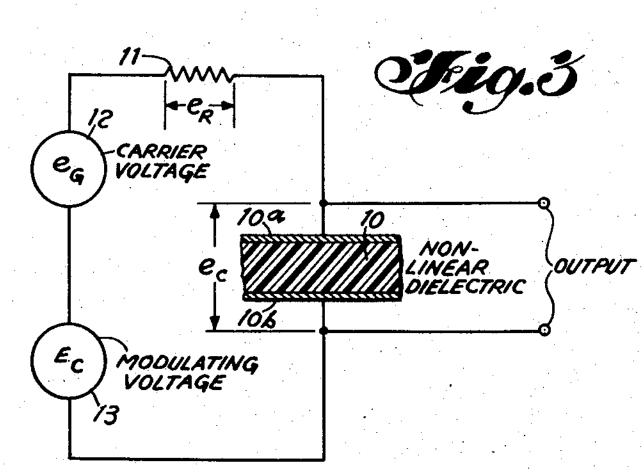
Fig. 3 is a schematic diagram illustrating another embodiment of a circuit following the principles of this invention.

Referring to Fig. 3, there is illustrated a signal translating circuit following the principles of this invention including a non-linear dielectric material 10, such as barium titanate, included between two plates **10*a* and 10*b* to form a capacitor, a resistor 11, a source of energy waves or carrier voltage 12 and a source of modulating voltage 13**. The same type of relationship as occurred in the circuit of Fig. 1 can be shown to take place in the circuit of Fig. 3.

An analysis of the circuit of Fig. 3 illustrates that linear pulse position modulation may be obtained by using a non-linear dielectric as a circuit parameter. The process is analogous to a saturable magnetic core modulator.

Figure 4:
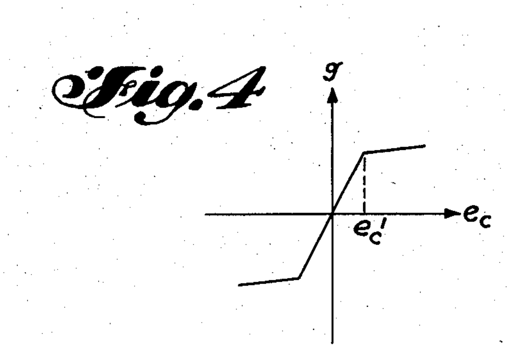
Fig. 4 is a transfer characteristic of the saturable material employed in the circuit of Fig. 3.

Assume that we have a dielectric 10 which has the properties shown in Fig. 4. The capacitance C is related to $g$ and $e_c$ by $$C=\frac{g}{e_c}$$

which is the slope of the $g-e_c$ characteristic, where $g$ is equal to change across the dielectric 10 and $e_c$ is equal to the voltage across the dielectric 10. It can be seen from the curve that C will take on two discrete values.

$$C=K \text{ (a constant) for } e_c<e'_c$$

$$C=0 \text{ for } e_c>e_c'$$

$e_c'$ is equal to voltage across dielectric 10 which causes it to saturate.

This means that if the voltage across the capacitor is less than $e_c'$ the capacitor acts as a normal linear impedance. When the voltage across the capacitor is greater than $e_c'$, the capacity goes to zero and the impedance across it goes to infinity.

Assume that a capacitor which is made of the dielectric described above is placed in the circuit of Fig. 3, where $E_c$ is the modulating voltage, $e_G$ equals the instantaneous value of the carrier voltage, $e_R$ equals the instantaneous resistor voltage drop and $e_c$ equals the instantaneous capacitor voltage drop. At any instant $e_G=e_R+e_c$, where $E_c$ is assumed zero, or $$e_G=iR+\frac{1}{c}\int idt$$

where $i$ is the instantaneous current. At any time before $e_c=e_c'$, assume that $e_R \gg e_c$ or $$iR\gg\frac{1}{c}\int idt$$

Therefore, $e_G\cong iR$ or $$i\cong\frac{e_G}{R}$$

but $e_c=\int idt$ or $$e_c=\frac{1}{c}\int\frac{e_G}{R}dt$$

or $$e_c=\frac{1}{RC}\int e_G dt \quad (5)$$

This equation states that the generator voltage will be integrated across C. Assume $e_G$ is a square wave voltage. This may be expressed as $e_G=E$ where E equals the value of the voltage of the square wave. Substitute $e_G$ in Equation 5.

$$e_c=\frac{1}{RC}\int Edt$$

or $$e_c=\frac{E}{RC}t+E_c=e_{c1}+E_c \quad (6)$$

where $e_{c1}$ is the capacitor voltage due to the generator 12 voltage and $E_c$ is the initial voltage across C. From the above analysis it can be seen that $e_c$ will approach $e_c'$ linearly with respect to time.

Figure 5:
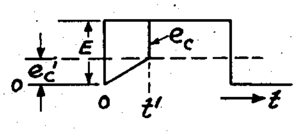
Figs. 5 and 6 are diagrams to aid in the understanding of the operation of the circuit of Fig. 3.

At time $t'$, with respect to the beginning of the period of E, $e_c=e_c'$. At this time the capacity will go to zero and the impedance across C will go to infinity. Therefore, at $t'$ the whole of E will appear across C and there will be a pulse of voltage across C. This action is illustrated in Fig. 5 where $E_c$ is assumed zero.

If $E_c$ is allowed to take on discrete values, then $e_c$ will arrive at $e_c'$ at a time other than $t'$. This is illustrated in Fig. 6.

Figure 6:
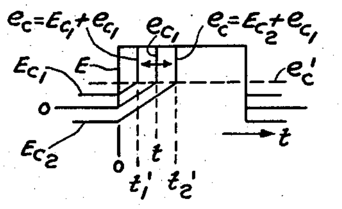

If $E_c$ is considered a modulating voltage then it can be seen from Fig. 6 that the firing time $t'$ will be linearly related to $E_c$. This can be shown mathematically by solving for $t'$ in Equation 6.

$$e_c=\frac{E}{RC}t+E_c \quad (6)$$

at $$t=t'e_c=e_c'$$

or $$e_c'=\frac{E}{RC}t'+E_c$$

$$t'=\frac{RC}{E}(e_c'-E_c)$$

Therefore, $t'$ is linearly related to $E_c$, the modulating signal and linear pulse position modulation is obtained.

As was described in the case of the circuit of Fig. 1, it can be shown that the circuit may be used as a pulse position compressor and expander or an analog computer component. This is done as in the circuit of Fig. 1 by letting $e_G$ take on various waveshapes having non-linear time integrals.

An example will be presented. From Equation 5

$$e_c=\frac{1}{RC}\int e_G dt$$

Assume $e_G=Kt$, that is a sawtooth substantially as illustrated by waveform 9, Fig. 1. Then $$e_c=\frac{1}{RC}\int Kt$$

or $$e_c=\frac{K}{2RC}t^2+E_C$$

at time $$t=t',\ e_c=e_c'$$

or $$e_c'=\frac{K}{2RC}(t')^2+E_C$$

Solving for the firing time $$t'=\left[\frac{2RC}{K}(e_c'-E_c)\right]^{1/2}$$

If $E_c$ is considered the modulating signal, it can be seen that the position of the modulated output pulse will be proportional to the half power of the modulating signal. Therefore, the position modulation pulses will be compressed. The position modulated pulses can be expanded by employing the same procedure as discussed in connection with the circuit of Fig. 1 where the proper waveshape for $e_G$ is $e_G=f\ (t^{-1/2})$.

The modulating signal source is coupled in series with the carrier voltage signal source since placing the modulating voltage across the condenser or dielectric 10 would cause a large voltage due to $e_G$ to be coupled into the modulating source. Also the impedance across C would be limited by the modulating source and impedance. A compensating circuit should be included in the modulating voltage source to prevent the frequency variation of the modulating voltage from upsetting the characteristics of the capacitor.

The circuit parameter values of the circuits of both Figs. 1 and 3 will depend upon the highest modulating frequency and the carrier sampling rate. As explained above the circuits of this invention can find use as analog computer components, pulse position compressor circuit and pulse position expander circuit. Its use as a compressor and expander circuits could improve the pulse time modulation communication art since these two units of a pulse position compander increases the signal to noise ratio and also decreases crosstalk.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal translating circuit comprising a source of energy waves having a given non-linear time integral, a saturable material having a non-linear characteristic coupled to said source of energy waves, a source of modulating signal in coupled relation to said saturable material to control the time of saturation thereof, said time of saturation being non-linearly related to said modulating signal and means to couple time modulated pulses from said saturable material at said time of saturation.

2. A signal translating circuit comprising a source of energy waves having a given non-linear time integral, a saturable material having a non-linear characteristic coupled to said source of energy waves, a source of modulating signal in coupled relation to said saturable material to control the time of saturation thereof, and an output means in coupled relation with said saturable material to remove time modulated pulses therefrom having a time position modulation proportional to non-linear function of the modulating signal.

3. A circuit according to claim 2, wherein said saturable material is a non-linear dielectric material.

4. A circuit according to claim 3, wherein said output means includes output terminals coupled across said dielectric material.

5. A circuit according to claim 3, wherein said source of modulating signal is in series relationship with said dielectric material and said source of energy waves.

6. A circuit according to claim 3, wherein said dielectric material is barium titanate.

7. A pulse time modulation compressor circuit comprising a source of alternating sawtooth waves, a saturable material having a non-linear characteristic coupled to said source of energy waves, and a source of modulating signal in coupled relation to said saturable material to control the time of saturation thereof to be a non-linear function of said modulating signal to compress the time position of the saturation of said saturable material in relation to the normal time of saturation caused by said modulating signal.

8. A circuit according to claim 7, wherein said saturable material is a non-linear dielectric material.

9. A circuit according to claim 7, wherein said dielectric material is barium titanate.

10. A pulse time modulation expander circuit comprising a source of energy waves having a waveform varying as a function of time to the minus one half power, a saturable material having a non-linear characteristic sensitive to energy current coupled to said source of energy waves, and a source of modulating signal in coupled relation to said saturable material to control the time of saturation thereof to be a non-linear function of said modulating signal to expand the time position of the saturation of said saturable material in relation to the normal time of saturation caused by said modulating signal.

11. A circuit according to claim 10, wherein said saturable material is a non-linear dielectric material.

12. A circuit according to claim 11, wherein said dielectric material is barium titanate.

References Cited in the file of this patent

UNITED STATES PATENTS

| | | |
|---|---|---|
| 2,080,459 | Caruthers | May 18, 1937 |
| 2,284,401 | Manley et al. | May 26, 1942 |
| 2,293,628 | Reiling | Aug. 18, 1942 |
| 2,470,893 | Hepp | May 24, 1949 |
| 2,555,959 | Curtis | June 5, 1951 |
| 2,638,572 | Goubau | May 12, 1953 |

FOREIGN PATENTS

| | | |
|---|---|---|
| 1,068,856 | France | May 4, 1955 |